United States Patent
Goldberg et al.

(10) Patent No.: US 8,348,527 B2
(45) Date of Patent: Jan. 8, 2013

(54) CAMERA HOLDER AND SHUTTER ACTIVATION DEVICE

(76) Inventors: Jeffrey M. Goldberg, Brooklyn, NY (US); Murray G. Goldberg, Palm Beach Gardens, FL (US)

( * ) Notice: Subject to any disclaimer, the term of this patent is extended or adjusted under 35 U.S.C. 154(b) by 47 days.

(21) Appl. No.: 12/925,139

(22) Filed: Oct. 14, 2010

(65) Prior Publication Data

US 2011/0091195 A1    Apr. 21, 2011

Related U.S. Application Data

(60) Provisional application No. 61/279,318, filed on Oct. 19, 2009.

(51) Int. Cl.
*G03B 17/00* (2006.01)
(52) U.S. Cl. .......... 396/419; 396/56; 396/425
(58) Field of Classification Search .......... 396/56, 396/419, 420, 425, 427, 439
See application file for complete search history.

(56) References Cited

U.S. PATENT DOCUMENTS

| | | | |
|---|---|---|---|
| 2,596,222 A * | 5/1952 | Doyle et al. | 396/7 |
| 3,096,698 A * | 7/1963 | Stoutenburg | 396/19 |
| 4,433,903 A * | 2/1984 | Afdasta | 396/59 |
| 4,473,177 A * | 9/1984 | Parandes | 224/191 |
| 7,379,664 B2 * | 5/2008 | Marcus | 396/56 |
| 7,471,334 B1 * | 12/2008 | Stenger | 348/373 |
| 7,706,673 B1 * | 4/2010 | Staudinger et al. | 396/58 |
| 8,002,480 B2 * | 8/2011 | Polster | 396/425 |
| 2007/0031143 A1 * | 2/2007 | Riccardi | 396/420 |

* cited by examiner

*Primary Examiner* — Clayton E Laballe
*Assistant Examiner* — Warren K Fenwick
(74) *Attorney, Agent, or Firm* — R. Neil Sudol; Coleman Sudol Sapone P.C.

(57) ABSTRACT

A camera holder and activation device enables a user to take pictures from vantage points spaced from the user's head. A frame defines a camera support position and an attachment device removably mounts the camera to the frame at the camera support position. An extension member such as a monopole is connected to the frame, whereby the frame may be so spaced from a user that the user cannot directly view a contemplated picture via a picture-framing element of the camera. A shifter member is movably mounted to the frame and is provided with a projection extending towards the camera support position so that motion of the shifter member brings the projection into contact with a shutter button of the camera mounted to the frame at the support position.

12 Claims, 4 Drawing Sheets

CAMERA HOLDER AND SHUTTER ACTIVATION DEVICE

BACKGROUND OF THE INVENTION

This invention relates to a camera holding device that enables a user to take pictures with the camera at a position remote from the user.

Previously, film photography cameras were built with the ability to attach a remote triggering mechanism. This was usually built into the shutter button. With the popularity of digital photography, the vast majority of cameras have no such attachment. Previously one had to manually depress the shutter button in order to activate the shutter mechanism and activate the metering system.

Conventional devices that enable remote positioning of a camera typically include a monopod or tripod. However, these devices require cameras with cables connected to the shutter actuation mechanism. For instance, a device labeled the "Quikpod" (www.quikpod.com) purportedly enables remote picture taking but relies upon the camera to auto shoot. This prior art does not allow for adequate framing or definitive timing of the picture.

OBJECTS OF THE INVENTION

It is an object of the invention to provide a camera holder assembly which enable disposition and operation of a camera at a location beyond reach of a user's hands and beyond direct visual observation of the picture view finder or display by the user.

It is an object of the invention to provide such a camera holder assembly utilizable with current digital cameras.

Another object of the present invention is to provide such a camera holder assembly which is inexpensive.

Another object of the present invention is to provide such a camera holder assembly which is easy to use.

These and other objects of the present invention will be apparent from the descriptions and drawings herein. Although every object of the invention is attainable by at least one embodiment of the invention, there is not necessarily any single embodiment that achieves all of the objects of the invention.

SUMMARY OF THE INVENTION

The present invention is directed to a camera holder and activation device for enabling a user to take pictures from vantage points spaced from the user. The camera holder and activation device comprises in part a frame defining a camera support position and an attachment device couplable to the frame for removably mounting a camera to the frame at the camera support position. The frame is configured for connecting an extension member to the frame, whereby the frame may be so spaced from a user that the user cannot directly view a contemplated picture via a picture-framing element of the camera. The camera holder and activation device further comprises a shifter member movably mounted to the frame, the shifter member being provided with a projection extending towards the camera support position from one side thereof so that motion of the shifter member brings the projection into contact with a shutter button of the camera mounted to the frame at the support position.

The camera support position may be defined by a planar surface of the frame, the planar surface being configured for receiving the camera.

Pursuant to another feature of the present invention, the frame includes a post extending orthogonally with respect to the plane of the planar surface. The post defines a track for the shifter member. The shifter member is slidably mounted to the post for alternating motion in opposite directions along the post.

Preferably, the shifter member is spring loaded to bias the shifter member so that the projection is spaced away from the shutter button of a camera mounted to the frame at the camera support position. The shifter member may include a first piece or arm extending parallel to the post and the track and a second piece or arm extending perpendicularly to the first piece, the projection being mounted to the second piece.

The frame may include a planar first section and a planar second section oriented parallel to one another, with the planar surface being located on the first section. The second section is configured to attach the frame to the extension member. The planar surface and the projection are located on a side of the first section opposite the second section. The first section and the second section may be opposed planar plates of a substantially rectangular frame member.

In accordance with a further feature of the invention, the camera holder and activation device further comprises a remote viewer operatively connected to the frame for enabling the user to remotely view a picture image on a display of the camera. The remote viewer may include a mirror attached to the frame, for instance where the remote viewer takes the form of a periscope. Alternatively, more sophisticated and expensive viewers may be used, including those with wireless transmission.

In accordance with an additional feature of the present invention, the camera holder and activation device further comprises an actuator in the form of elongate tensile member such as a cable or cord coupled to the shifter member for enabling a user spaced from the frame and the camera to move the shifter member.

Preferably, the projection is adjustably mounted to the shifter to vary a location of the projection relative to the frame, thereby enabling adaptation of the camera holder to cameras having variously positioned shutter buttons.

A method for taking a photograph comprises, in accordance with the present invention, (a) providing a camera and a camera holder having a frame and a shutter button actuator movably mounted relative to the frame, (b) attaching the camera to the frame so that a shutter button of the camera is aligned with a projection of the shutter button actuator, (c) by means of an extension member coupled to the frame, holding the frame and the camera at a location so spaced from a user that the user cannot directly view a contemplated picture via a picture framing element of the camera, and (d) thereafter operating the shutter button actuator to bring the projection into contact with the shutter button of the camera, thereby triggering the camera to take a photograph.

Pursuant to another feature of the present invention, the method further comprises using a remote viewing device to view a potential picture via the picture-framing element prior to the operating of the shutter button actuator. The remote viewing device may be a periscope connected at least in part to the frame, so that the method further comprises adjusting a mirror of the periscope.

The attaching of the camera to the frame includes selecting a location of the camera relative to the frame so that the shutter button of the camera is aligned with a travel path of the projection.

The extension member is likely a monopod or a tripod, with the method further comprising the step of attaching the extension member to the frame prior to the holding of the frame and the camera.

On one embodiment of the invention, the operating of the shutter button actuator includes translating a slider member of the shutter button actuator relative to the frame, where the projection is fixed to the slider member.

A camera holder and activation device in accordance with the present invention enables a user to take photographs remotely with a conventional camera, particularly a digital camera with a picture-viewing element in the form of a display screen on the rear panel of the camera. The invention is useful, for example, for taking photographs of events attended by crowds of people. The camera is held over the heads of people in front of the photographer.

In general, the camera holder and activation device of the present invention enables the user of a conventional digital display camera to take photographs from vantage points where the user cannot position himself or herself owing to physical constraints of the exigent circumstances. Such situations may include taking photographs from constricted spaces where the photographer cannot fit.

With the present invention, a camera user has the ability to elevate a camera several feet and have full control over the shutter button. The camera-holding device of the invention is adjustable to accommodate most available point-and-shoot-type cameras as well as other cameras that can be mounted on the holding device.

DETAILED DESCRIPTION

Figure 2:
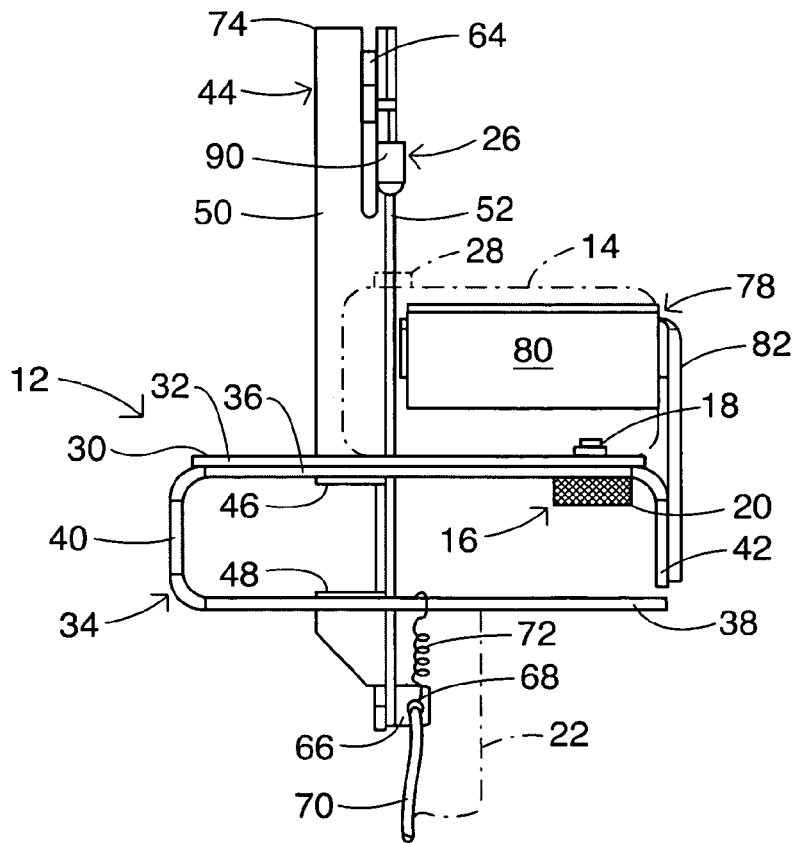
FIG. 2 is a schematic front elevational view of the camera holder and activation device of FIG. 1.

As depicted in the drawings, a camera holder and activation device comprises in part a frame 12 defining a support position for a camera 14 (FIGS. 2 and 5) and an attachment device 16 in the form of a thumbscrew or set screw 18 with a knob 20 coupled to the frame for removably mounting a camera to the frame at the camera support position. The screw 18 inserts into a threaded hole provided on the bottom panel of most digital cameras for mounting the cameras to tripods.

Figure 4:
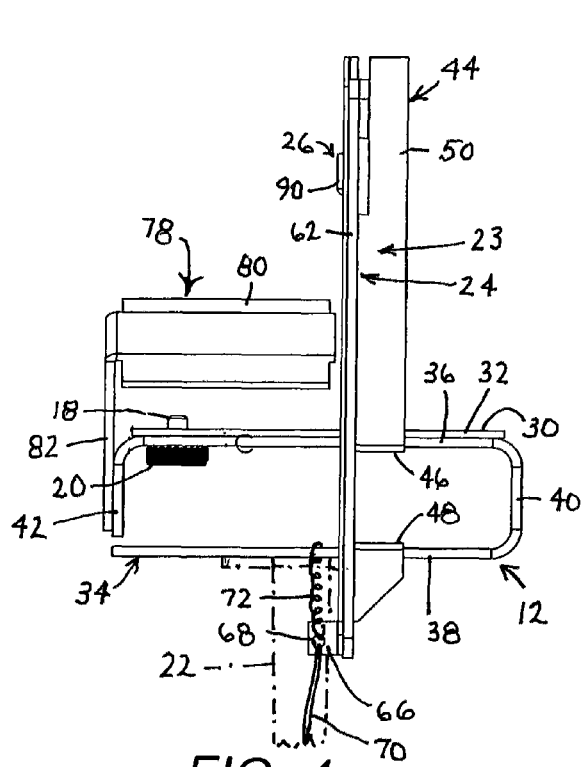
FIG. 4 is a schematic rear elevational view of the camera holder and activation device of FIGS. 1-3.

Frame 12 is configured for connecting an extension member 22 (FIGS. 2 and 4) to the frame so that the camera mounted on the frame may be positioned and supported substantially above the eye level of the user. Extension member 22 may take the form of a rod or monopole which rests on a ground surface and which the user grasps by one hand to stabilize the assembly. It is to be noted that in use the extension member 22 need not extend vertically but may be oriented at any angle relative to a ground surface as the photography circumstances may require.

The camera holder and activation device further comprises a shutter button actuator 23 including a shifter member 24 movably mounted to frame 12. Shifter button actuator 23 further includes a projection or finger 26 extending towards camera 14 from one side thereof so that manually induced motion of shifter member 24 brings projection 26 into contact with a shutter button 28 of the camera mounted to the frame at the support position.

The camera support position is defined by a planar surface or platform 30 of frame 12 or an upper surface of an optional pad 32. Planar surface 30 receives the camera.

Frame 12 includes a plate member 34 bent into a rectangular shape having a planar upper section 36 and a planar lower section 38 connected to one another at one side by a middle or bight section 40. Upper and lower plate sections 36 and 38 extend parallel to one another, as does middle or bight section 40 and an end section 42. Camera support surface or platform 30 is an upper surface of upper plate section 36 or an upper surface of pad 32.

Frame 12 further includes a post or column 44 in the form of a cross-sectionally L-shaped plate connected to upper plate section 36 and lower plate section 38 via a pair of tabs 46 and 48. Tabs 46 and 48 are cut and bent from a planar main section 50 of post 44 that is positioned flush against an edge 52 of upper plate section 36. Post 44 further includes a flange 52 perpendicular to main section 50 of the post. Post 44 is laterally offset from the middle of plate sections 36 and 38 for facilitating alignment of projection 26 with the shutter button 28 of variously sized cameras, as will be apparent from the structure and use of the camera holder and shutter activation device.

Post 44 extends orthogonally with respect to planar camera-receiving surface 30 and forms a track for shifter member 24. Shifter member 24 is slidably connected to post 44 via bolts 54 and 56 (FIG. 5) that traverse respective slots 58 and 60 in flange 52. Bolts 54 and 56 are rigid with shifter member 24 and are held to flange 52 by nuts (not shown) and nylon washers (not shown) to facilitate a low-friction gliding motion. Shifter member 24 is slidably mounted to post 44 for alternating motion in opposite directions along the post.

Shifter member 24 is spring loaded to bias the shifter member so that projection or finger 26 is spaced away from shutter button 28 of camera 14 which is mounted to frame 12 at the camera support position. Shifter member 24 includes a main piece or arm 62 (FIG. 4) extending parallel to post 44 and a cross piece or traversing arm 64 extending perpendicularly to the first piece and parallel to camera-receiving surface 30. Projection or finger 26 is mounted to the cross arm 64 and is pointed towards surface 30.

Piece or arm 62 of shifter member 24 extends parallel to flange 52 and carries bolts 54 and 56. A lower end of shifter arm 62 carries a tab 66 (FIGS. 2 and 4) that extends on a side of flange 52 opposite the shifter arm 62. Tab 66 is provided with an aperture 68 by means of which a tensile shutter activation member 70 such as a cable is connected. In addition, a spring member 72 such as a helical spring or rubber band is connected at one end to tab 66 via aperture 68 and at an opposite end to lower plate section 38 of frame 12. An aperture (not shown) may be formed along an end of lower plate section 38 for receiving an end of spring member 72.

Spring member 72 biases shifter member 24 in a direction away from camera support surface 30. Camera shutter button 28 is manually and remotely actuated when a user pulls on tensile shutter activation member 70 to pull shifter member along post 44 so that shifter arm 64 moves towards camera support surface 30 and camera 14 disposed thereof and so that projection 26 is brought into sufficient contact with shutter button 28 so as to press the shutter button and take a picture. Projections 26 is preferably provided with a rubber shield or cover 90 that comes into contact with shutter button 28 and protects the shutter button while ensuring against potential lateral sliding of the shutter button and projection 26 relative to one another.

Projection-supporting shifter arm 64 extends through a slot 74 (FIGS. 1 and 2) formed in main section 50 of post 44. During a reciprocation of shifter member 24, arm 64 moves in alternate directions along slot 66.

Figure 3:
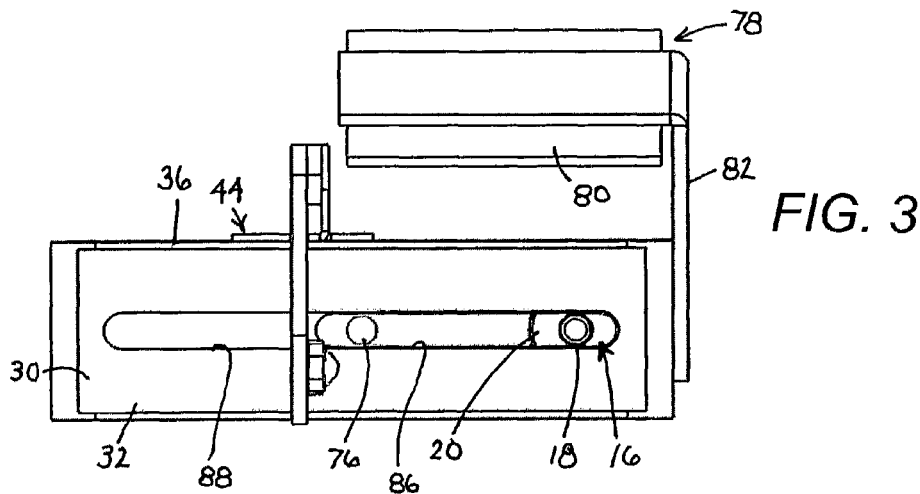
FIG. 3 is a schematic top plan view of the camera holder and activation device of FIGS. 1 and 2.

Lower plate section 38 of frame 12 is provided with a threaded hole 76 (FIGS. 1 and 3) for attaching the frame to extension member 22. Camera support surface 30 and button-pressing projection 26 are located on a side of upper plate section 36 opposite lower plate section 38.

In contemplated use, frame 12 is placed by means of extension member 22 at a location so spaced from a user that the user cannot directly view a contemplated picture via a picture-framing element of the camera (e.g., a liquid crystal display). While a picture can be taken blindly with the camera holder and activation device as described above, it is preferred that the camera holder and activation device incorporate a remote viewer 78 for enabling the user to remotely view a picture image on a display of the camera. Remote viewer 78 includes a mirror 80 attached to end section 40 of frame 12 via a pivotable arm 82. A second mirror (not shown) may be attached to extension member 22 so that remote viewer 78 takes the form of a periscope. Alternatively, more sophisticated and expensive viewers may be used, including those with wireless transmission.

Figure 1:
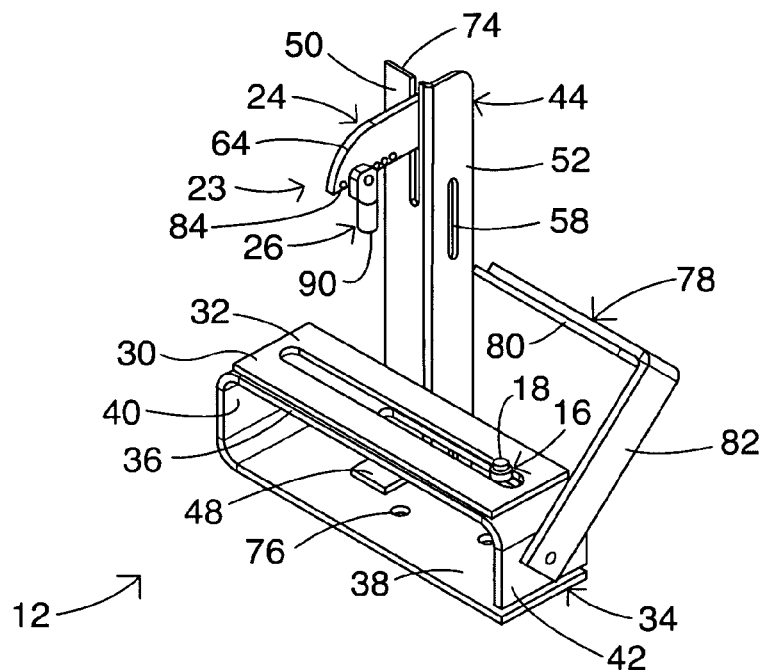
FIG. 1 is a schematic isometric or perspective view of a camera holder and activation device in accordance with the present invention.
Figure 5:
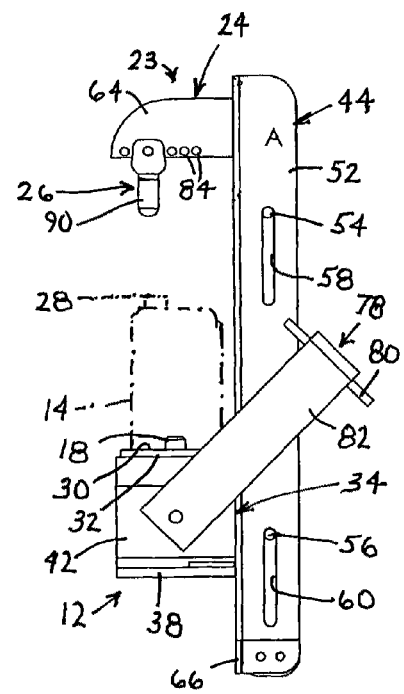
FIG. 5 is a schematic right side elevational view of the camera holder and activation device of FIGS. 1-4.
Figure 6:
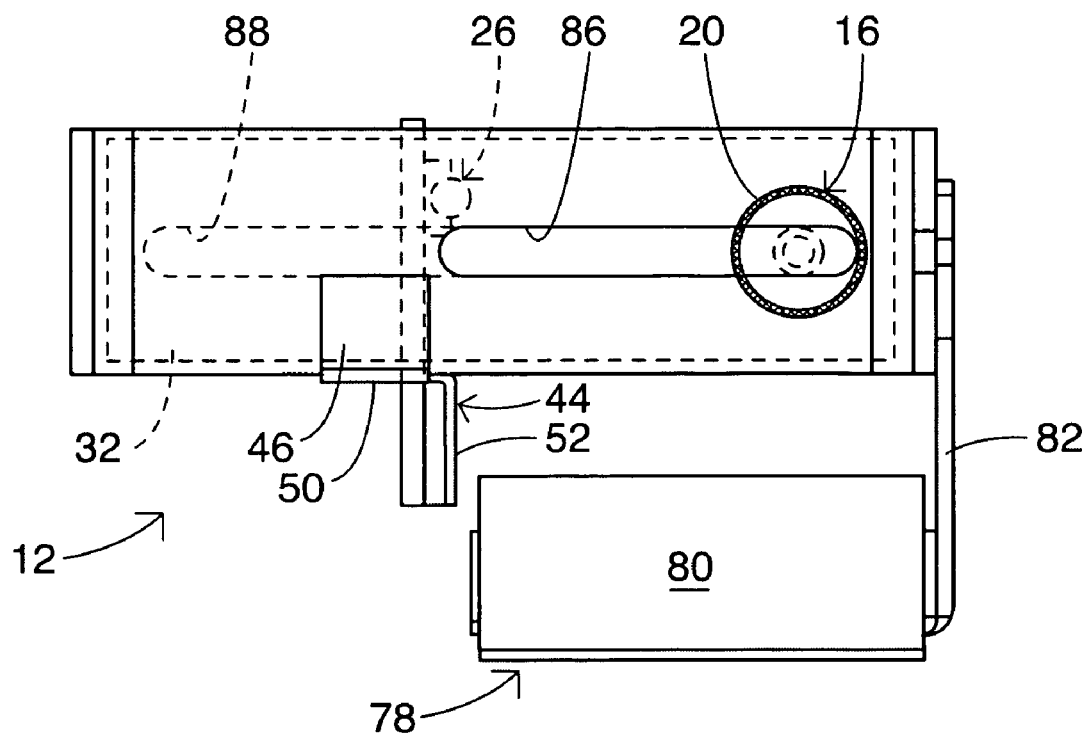
FIG. 6 is a schematic cross-sectional view taken along line VI-VI in FIGS. 2 and 4.

As shown in FIGS. 1 and 5, shifter cross arm 64 is provided with a linear array of apertures 84 (mutually interspaced exemplarily by about 0.5 centimeter) for enabling adjustment in the location of projection 26 relative to post 44 and frame 12, thereby enabling adaptation of the camera holder and activation device to cameras having variously positioned shutter buttons.

To use the camera holder and activation device described above, one attaches the camera 14 to frame 12 so that the lens of the camera faces away from post 44 and shutter button 28 is aligned with projection 26 of the shutter button actuator 23. More particularly, camera 14 is disposed on surface 30 so that a hole in the bottom of the camera is aligned with mounting screw 18. Knob 20 is turned to insert the screw into the hole. However, the screw is not tightened until the position of camera 14 is adjusted so that shutter button 28 is aligned with shifter cross arm 64. To accommodate the adjustment in the position of camera 14, upper plate section 36 is provided with an elongate channel or slot 86 traversed by screw 18. (See FIGS. 1 and 3.) Pad 32 is likewise provided with an elongate slot 88 that is at least partially coextensive with slot 86.

After the alignment of camera shutter button 28 with shifter arm 64, knob 20 is turned to tighten screw 18 and firmly mount camera 14 to frame 12. If necessary, the position of projection 26 along shifter arm 64 is adjusted to align the projection, and concomitantly a travel path thereof parallel to post 44 and shifter arm 62, with shutter button 28.

Extension member 22 is connected to frame 12 by inserting a bolt through hole 76 in lower plate section 38 and tightening a wing nut (not shown) or other fastener to the bolt. By means of extension member 22, the user holds frame 12 with camera 14 mounted thereto at a location where the user cannot directly view a contemplated picture via a picture-framing element of the camera. Thereafter, holding extension member 22 with the camera remotely positioned from the user's head, the user pulls tensile shutter activation member 70 in opposition to a returning force exerted by spring member 72, to thereby operate shutter button actuator 23 and more specifically translate shifter member 24 so that projection 26 is brought into effective contact with shutter button 28 to thereby trigger the camera 14 to take a photograph.

As mentioned above, the operator may use mirror 80 to view a picture-finding display on the rear panel of camera 14 prior to pulling tensile shutter activation member 70 to actuate shutter button 28. Typically, the user attaches a second mirror to extension member 22 and aligns the additional mirror with mirror 80 so as to form a convenient periscope. Mirror 80 is tiltable via support arm 82 to assist in periscope adjustment. The additional mirror may be attached to extension member 22 by any appropriate means.

Figure 7:
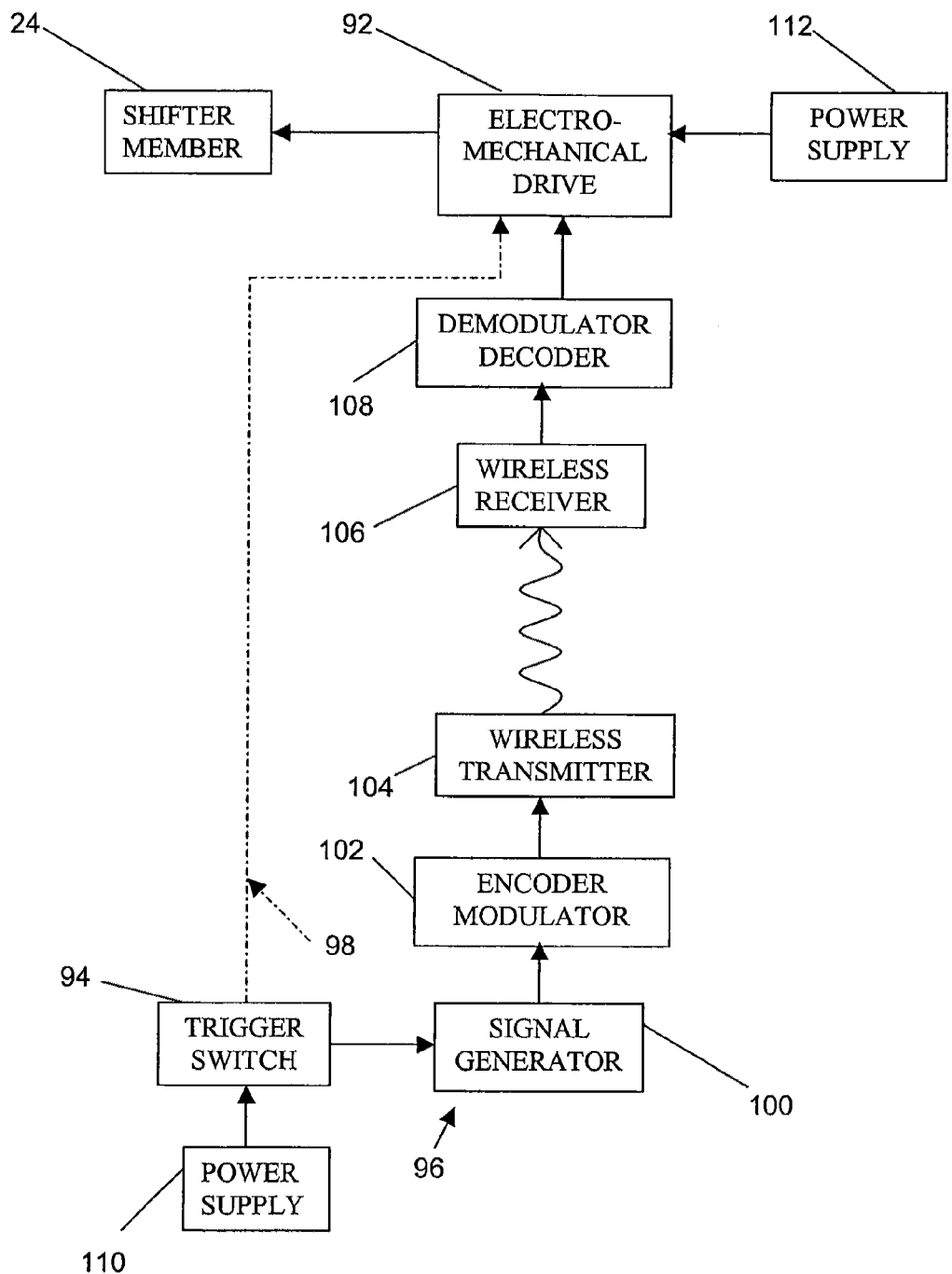
FIG. 7 is a block diagram of an electrical assembly for activating a shutter button actuator in a camera holder an activation device in accordance with the present invention.

Shifter member 24 may be translated along post 44 by other mechanisms, different from tensile activation member 70. As illustrated schematically in FIG. 7, an electro-mechanical drive 92 such a motor or a solenoid is operatively linked to shifter member 24 for translating that member in opposition to the return force exerted by spring member 72. Electromechanical drive 92 is energized in response to manual actuation of a trigger switch 94. Switch 94 may be operatively connected to electro-mechanical drive 92 via a wireless transmission link 96 or a hard-wired transmission path 98. Wireless transmission link 96 includes a signal generator 100 downstream of trigger switch 94, an encoder and modulator 102, a transmitter 104, a receiver 106, and a demodulator and decoder 108 which is connected to electro-mechanical drive 92. Hard-wired transmission path 98 may be attached along its length to extension member 22 and typically includes sockets and plugs (not shown) for accommodating the connection and disconnection of extension member 22 to frame 12. Trigger switch 94 may be mounted to extension member 22 at an end thereof opposite frame 12. A single power supply 110 may be attached to extension member at a lower end thereof in the case of hard-wired transmission path 98. An additional power supply 112 is mounted to frame member 12 in the case of wireless transmission link 96.

Although the invention has been described in terms of particular embodiments and applications, one of ordinary skill in the art, in light of this teaching, can generate additional embodiments and modifications without departing from the spirit of or exceeding the scope of the claimed invention. For instance, it is to be noted that while set screw 18 threadably coupled to camera support frame 12 is used for removably mounting camera 14 to the frame, different or additional hardware may be provided for implementing an alternative mounting of the camera to the frame. Such alternative mounting hardware may include (i) one or more clamps or clips such as C-clamps, (ii) elastic or rubber bands, (iii) recesses or sockets with resiliently compressible liners or spring-loaded lever arms, (iv) latches or detents, etc., (v) a slider coupling exemplarily including grooves and mating projections, etc. The screw coupling is preferred since many cameras are provided with a screw hole for receiving a tripod mounting screw.

Extension member 22 may be a telescoping tube for convenience of transport. Tensile member 70 may be connected to extension member 22, for example, by eyelets spaced along the length of the tensile member. Tensile member 70 may be provided at the operator end with a pull ring (not shown) or trigger (not shown).

A lens may be provided for facilitating visualization of the picture details on the camera display, the lens augmenting the effect of mirror 80 and the additional periscope mirror member (not shown) on extension member 22.

Accordingly, it is to be understood that the drawings and descriptions herein are proffered by way of example to facilitate comprehension of the invention and should not be construed to limit the scope thereof.

What is claimed is:

1. A camera holder and activation device comprising:
   a frame defining a camera support position;
   attachment means for removably mounting a camera to said frame at said camera support position, said frame being configured for connecting an extension member to said frame, whereby said frame may be so spaced from a user that the user cannot directly view a contemplated picture via a picture-framing element of said camera;
   a shifter member movably mounted to said frame, said shifter member being provided with a projection extending towards said camera support position from one side thereof so that motion of said shifter member brings said projection into contact with a shutter button of said camera mounted to said frame at said support position; and
   remote viewing means operatively connected to said frame for enabling the user to remotely view a picture image on a display of said camera, said remote viewing means including a first mirror and a second mirror disposed in a periscope arrangement.

2. The camera holder and activation device defined in claim 1 wherein said camera support position is defined as a plane.

3. The camera holder and activation device defined in claim 2 wherein said frame includes a post extending orthogonally with respect to said plane, said post defining a track for said shifter member, said shifter member being slidably mounted to said post for alternating motion in opposite directions along said post.

4. The camera holder and activation device defined in claim 3 wherein said shifter member is spring loaded to bias said shifter member so that said projection is spaced away from the shutter button of a camera mounted to said frame at said support position.

5. The camera holder and activation device defined in claim 3 wherein said shifter member includes a first piece extending parallel to said post and said track and a second piece extending perpendicularly to said first piece, said projection being mounted to said second piece.

6. The camera holder and activation device defined in claim 2 wherein said frame includes a planar first section and a planar second section oriented parallel to one another, said first section having a planar surface in said plane, said second section being configured to attach said frame to said extension member, said planar surface and said projection being located on a side of said first section opposite said second section.

7. The camera holder and activation device defined in claim 6 wherein said first section and said second section are opposed planar plates of a substantially rectangular frame member.

8. The camera holder and activation device defined in claim 1 wherein said first mirror is attached to said frame and said second mirror is attached to said extension member.

9. The camera holder and activation device defined in claim 1, further comprising an actuator coupled to said shifter member for enabling a user spaced from said frame and said camera to move said shifter member.

10. The camera holder and activation device defined in claim 9 wherein said actuator comprises an elongate tensile member.

11. The camera holder and activation device defined in claim 9 wherein said actuator includes a drive device operatively linked to said shifter member, said actuator further including a trigger element operatively connected to said drive device to operate same.

12. The camera holder and activation device defined in claim 1 wherein said projection is adjustably mounted to said shifter to vary a location of said projection relative to said frame, thereby enabling adaptation of the camera holder and activation device to cameras having variously positioned shutter buttons.

* * * * *